INVENTORS
D.E. LUPFER
M.W. OGLESBY, JR.

ATTORNEYS

United States Patent Office 3,175,764
Patented Mar. 30, 1965

3,175,764
PNEUMATIC COMPENSATING CONTROL CIRCUIT TO MINIMIZE PROCESS DEAD TIME
Dale E. Lupfer and Minor W. Oglesby, Jr., Bartlesville, Okla., assignors to Phillips Petroleum Company, a corporation of Delaware
Filed June 12, 1961, Ser. No. 116,581
4 Claims. (Cl. 235—200)

This invention relates to an improved method of and apparatus for controlling a process.

In a conventional process feedback control system, a process variable is adjusted in response to a measured variable. If, for example, the rate of flow of a reactant to a reaction zone is adjusted in response to an analysis of the reaction product, the effectiveness of this control is dependent upon the characteristics of the reaction. The characteristics of the reaction are manifested by the product response to changes in the process variable. A change in a reaction process variable will produce a change in the reaction product, but said change in the reaction product will not become apparent until a period of time has elapsed. This period of time is known as dead time and is detrimental to process control systems because of excessive phase shift.

It is possible to compensate the reaction process so that the characteristic phase shift as applied to a conventional controller is minimized. This type of control is referred to as compensated control.

Accordingly, an object of this invention is to provide an improved method of and apparatus for controlling a process.

Another object of this invention is to provide an improved method of and apparatus for pneumatically controlling a process whereby the effect of process dead time is reduced to a minimum.

Another object of this invention is to provide an improved method of and apparatus for pneumatically controlling a process wherein a process variable is adjusted in response to a change in another process variable, said change in another process variable representative of the effectiveness of said process.

Other objects, advantages, and features of our invention will be readily apparent to those skilled in the art from the following description and appended claims.

Figure 3:
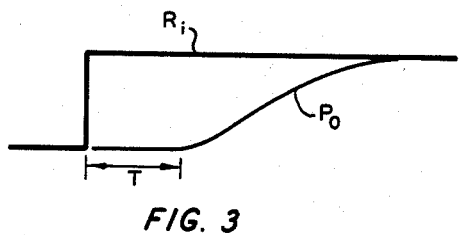
FIGURE 3 is a diagrammatic representation of a process response to a step input change.

Assuming that a reaction process provides a change in a product $P_0$ in response to a step input change, such as a rate of flow change in a reactant $R_i$, FIGURE 3 is illustrative of these changes with said reaction process having a dead time of T.

Thus a control system wherein a controller receives a signal indicative of a change in the reaction product $P_0$ and adjusts the rate of flow of reactant $R_i$ in response to said change in the reaction product, has an undesirable lag or phase shift due to process dead time. If the reaction process were to have the response illustrated by FIGURE 4, a more effective control method would be the result.

Figure 4:
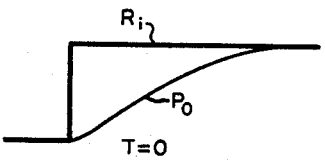
FIGURE 4 is a diagrammatic representation of a desired process response to a step input change.

It is possible to compensate the reaction process so that the response of FIGURE 4 is obtained. This method of control is referred to as a compensated control method.

We have discovered a compensated control method whereby a pneumatic signal representative of a change in a process variable is combined with a pneumatic signal from a compensating network and said combined signal passed to a controller. The controller then adjusts another process variable in response to this combined input signal.

Figure 1:
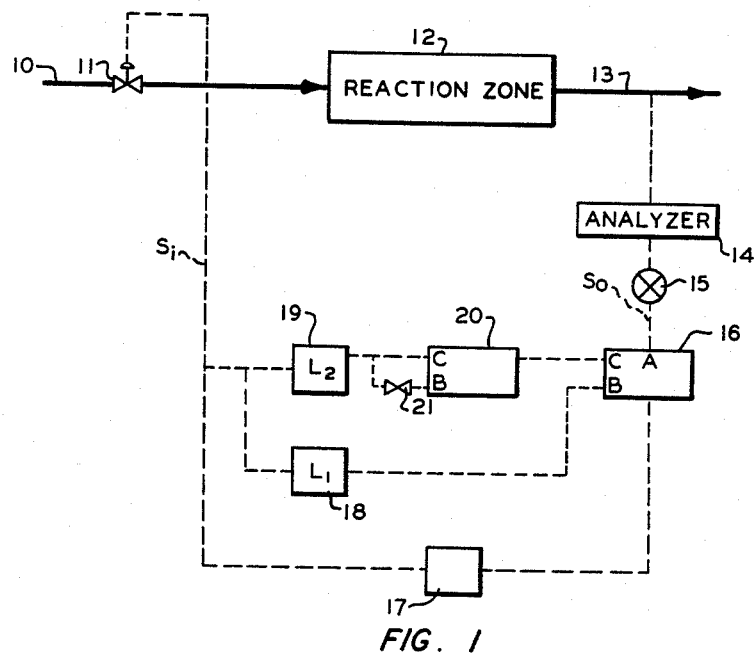
FIGURE 1 is a schematic representation of one embodiment of the inventive control method.

Referring to FIGURE 1, there is illustrated a conduit 10 by which means a reactant or catalyst can be passed through control valve 11 to a reaction zone 12. A product is withdrawn from reaction zone 12 by means of a conduit 13. A conventional analyzer 14, such as a means of measuring the density in the case of a polymerization reaction, is employed to analyze the reaction zone product passing through conduit 13. A conventional density method of analysis is described in Canadian Patent 596,496, issued April 19, 1960. A signal representative of said analysis is transmitted from analyzer 14 to a conventional pneumatic pressure-transmitter 15.

Pneumatic pressure transmitter 15 transmits a signal $S_o$ to a conventional pneumatic computing relay 16 capable of solving the following equation:

$$\text{Output} = g(A-C) + B$$

where A, B, and C are input variables and $g$ is the adjustable gain of computing relay 16. A conventional pneumatic computing relay capable of solving the above equation is a Foxboro M58–1 computing relay illustrated in Bulletin 13–19, or a Foxboro M56–1 Computing Relay illustrated in Bulletin 37–57a, distributed by The Foxboro Company, Foxboro, Massachusetts.

An output signal is transmitted from computing relay 16 to a conventional controller 17, said controller 17 capable of comparing this input signal with a set point and transmitting a signal $S_i$ to thus open or close valve 11 in response to said input signal. Controllers of this general description are described in Process Instruments and Controls Handbook, 11–12 to 11–27, by Considine, published by McGraw-Hill Book Company, Inc., 1957. Controller 17 also transmits a signal $S_i$ to pneumatic signal lag means 18 and 19 having lags $L_1$ and $L_2$, respectively.

A pneumatic signal is transmitted by lag means 19 and received by pneumatic computing means 20 as an input variable C. Computing means 20 also receives a pneumatic signal as an input variable B, said pneumatic signal transmitted from lag means 19 via restriction means 21. Pneumatic computing means 20 must be capable of solving the equation:

$$\text{Output} = g(-C) + B$$

where B and C are input variables and $g$ is the adjustable gain of computing means 20. As previously noted, an instrument capable of solving the above equation is a conventional Foxboro M58–1 computing relay. Computing relay means 20 transmits a signal which in turn is received by computing relay means 16 as an input variable C. Lag means 18 transmits a pneumatic signal which is received by computing relay means 16 as an input variable B.

A conventional feedback control system would be comprised of a controller 17 receiving a signal $S_o$ and transmitting a signal $S_i$ to open or close valve 11 in response to said input signal $S_o$. The remainder of the control system can, therefore, be considered as a compensating network.

Figure 5:
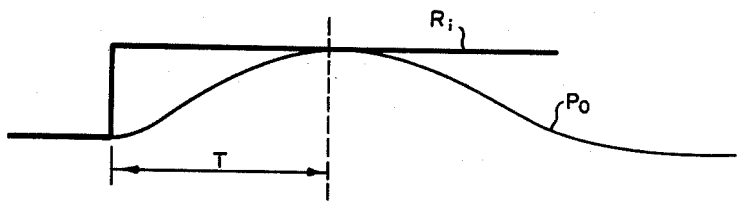
FIGURE 5 is a diagrammatic representation of the inventive compensating network response to a step input change.

As previously noted, it is desirous that the control system function so as to provide an output signal, represented by $S_o$ in FIGURE 1, in response to an input $S_i$ so as to produce the results illustrated in FIGURE 4. In order to obtain the results illustrated in FIGURE 4, it is necessary that the compensating network produce the response illustrated in FIGURE 5 for a step input change. The shape of the leading slope in FIGURE 5 is the same shape as the leading slope of the desired response in FIGURE 4. The shape of the responsive pulse to the right of the reference time line T is the same shape as the actual process response to the right of reference line T in FIGURE 3, with the exception that the response in FIGURE 5 is negative. The responsive pulse as illustrated in FIGURE 5 decays to zero.

Lags 18 and 19, restriction means 21 and computing relay 20 represent the necessary elements required to produce the desired pulse response of FIGURE 5. Lag means 18 provides an output signal which forms the leading slope of the FIGURE 5 pulse response. Lag means 19 provides an output, delayed a time T by restriction means 21 and computing relay means 20, which forms the trailing slope of the FIGURE 5 pulse response.

A means for pneumatically providing a lag comprises a restriction means or restrictor such as a needle valve and a capacitance such as a tank. A single restrictor and capacitance in series constitutes a first order exponential lag whose time constant is equal to the resistance of the restriction means multiplied by the capacitance, where said resistance and capacitance are in consistent units. Measuring the pressure drop across the restriction means and dividing said pressure drop by the quantity of flow through said restriction means is the method whereby the value for the resistance is obtained. If another restrictor and capacitance are placed in series with the first restrictor and capacitance, a second order interacting exponential lag will result. For successive higher order interacting lags, a restrictor and capacitance are added in series to the previous lag unit. For successive higher order non-interacting exponential lags, an isolation relay, restrictor and capacitance are added in series.

The function of lag means 18 and 19 must be such that a step change in the output signal transmitted by controller 17 will cause the output response of relay 16 to be equivalent to the process response exclusive of dead time. Although a lag means of providing an exponential response has been herein illustrated, it is also within the scope of this invention to provide other lag means for simulating any type process response exclusive of dead time. It is within the scope of this invention to eliminate lag means 18, passing an additional pneumatic pressure signal directly from lag means 19 as an input signal B to relay 16.

Of the compensating network, restriction means 21 and computing relay means 20 provide a means for pneumatically simulating the process dead time. As illustrated, restriction means 21 and computing relay means 20 are connected in such a manner as to provide a first order dead time approximation. It is within the scope of this invention to provide means of pneumatically simulating higher order dead time in producing the inventive compensating network. A method of pneumatically simulating a first order dead time approximation is completely described in copending application by D. E. Lupfer, entitled "A Method of and Apparatus for Improved Process Control." A method of pneumatically simulating higher order dead time approximations is completely described in a copending application Serial No. 95,089 by M. W. Oglesby and R. T. Brashear entitled, "Method of and Apparatus for Dead Time Simulation" filed March 13, 1961.

As previously noted, lag means 18 can under specific circumstances be eliminated. This is generally done when higher order dead time models are employed. It can be readily seen by those skilled in the art that lag means 18, 19, restriction means 21 and computing relay means 20 can be adjusted to fulfill the requirements set forth for the compensating network.

It can further be seen that the signal appearing at the output of computing relay means 20, which results from a step change in controller 17 output, will be exactly the same shape as the process response. A pneumatic signal appearing at the output of lag means 18 will be exactly equivalent to process response but without dead time.

The control circuit is adjusted so that the process gain as represented by $S_o/S_i$ or output of transmitter 15 divided by output of controller 17 of FIGURE 1 is substantially equal to one-half. This is accomplished by proper calibration of pneumatic transmitter 15. Computing relay means 20 is adjusted so that the value for $g$ is equal to ½. Computing relay means 16 is adjusted so that the value for $g$ is equal to 2.

Figure 2:
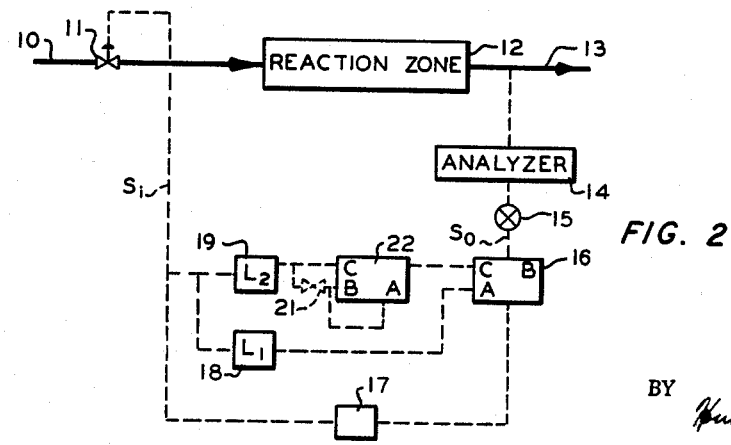
FIGURE 2 is a schematic representation of another embodiment of the inventive control method.

The control method as illustrated in FIGURE 1 is preferably employed when there is a substantially constant process gain. This is to say that the change in output divided by the change in input is substantially constant. With a process having a variable process gain, the embodiment illustrated by FIGURE 2 is preferred. As in the case of FIGURE 1, computing relay 16 must be capable of solving the equation:

$$\text{Output} = g(A-C)+B$$

However, a pneumatic signal transmitted from pneumatic transmitter 15 is received as input variable B by computing relay 16. The pneumatic signal transmitted by lag means 18 is received as input variable A.

Computing relay means 22 of FIGURE 2 must be capable of solving the equation:

$$\text{Output} = A-C+B$$

where A and B are input variables transmitted by lag means 19 through restriction means 21 and C is an input variable transmitted from lag means 19. The remainder of the compensation network functions as discussed in connection with the control circuit of FIGURE 1.

An advantage of the inventive control system illustrated by FIGURE 2 is that it is not necessary to adjust the control circuit so that the process gain as represented by $S_o/S_i$ is substantially equal to one-half. The value for $g$ of computing relay 16 may not be equal to 2 but can be adjusted as the process gain varies to vary the height of the signal pulse.

The control system of FIGURE 2 is preferred in that corrections can be easily made to the compensating network while the process and control systems are in operation. The only adjustment necessary is to change the gain of computing relay 16 to vary the pulse gain as the process gain changes from time to time.

Compensating the process in the manner described will permit a five to ten increase in the controller gain setting over and above the setting which can be utilized for conventional control thereby substantially increasing the sensitivity of the controller. Higher gain settings result in a faster return to the set point after an upset occurs and a tighter control loop.

Although the inventive control method has been described in terms of analyzing a reaction product and controlling a reactant feed in response thereto, it is obvious that the method of control is equally applicable to any process characterized by long dead time. The inventive control method has particular application in the control of a reaction zone wherein olefins are polymerized. The polymerization production rate can be determined by a heat balance computer as disclosed on page 32 of the October, 1959 issue of the ISA Journal. The flow of catalyst to the polymerization reaction zone in response to the determined production rate can be controlled by the previously described inventive control method.

The following example is presented to illustrate one aspect of the inventive control method.

*Example*

In the reaction zone 12 of FIGURE 2, ethylene is polymerized in the presence of cyclohexane and chromium oxide catalyst supported on silica-alumina containing approximately 2.5 weight percent chromium of which approximately 2 weight percent is hexavalent chromium, said ethylene passed to said reaction 12 through a line not herein illustrated. Lag means 18 and 19 are comprised of third order non-interacting lags. Each of said lag means 18 and 19 have time constants of 13.1, 11.1 and 0.5 minutes. The reaction is carried out at a temperature of 275° F. and at a pressure of approximately 400 p.s.i. The operating conditions are as follows:

| Feed (Stream) | Normal | After Decreased Catalyst Activity |
|---|---|---|
| Ethylene_____lbs./hr__ | 1,200 | 1,200 |
| Cyclohexane_____lbs./hr__ | 9,200 | 9,200 |
| Cyclohexane (10)_____lbs./hr__ | 5 | 5.7 |
| Catalyst (10)_____lbs./hr__ | 1.0 | 1.14 |
| Catalyst Activity____lb. polymer/lb. catalyst__ | 800 | 700 |

| Operating Conditions | Normal | After Decreased Catalyst Activity |
|---|---|---|
| Reactor Temperature, ° F_____ | 275 | 275 |
| Reactor Pressure, p.s.i_____ | 400 | 400 |
| Coolant (Tank) Temperature, ° F_____ | 240 | 240 |
| Cyclohexane Input Temp., ° F_____ | 165 | 165 |
| Polyethylene Production Rate, lbs./hr_____ | 800 | 800 |
| Polymerization Effluent (13), lbs./hr_____ | 10,000 | 10,000 |
| Heat of Reaction removed by indirect heat transfer, B.t.u./hr_____ | 576,000 | 576,000 |
| Heat of Reaction lost to incoming cyclohexane, B.t.u./hr_____ | 576,000 | 576,000 |

When the catalyst activity decreased from 800 pounds polyethylene/pound catalyst to 700 pounds polyethylene/pound catalyst as shown above, polyethylene productivity is briefly decreased to a rate of 700 pounds of polyethylene per hour, as determined by a density sensing analyzing means 14. A pneumatic signal representative of this determination, is transmitted from pneumatic transducer 15 to computing relay means 16. A pneumatic signal is transmitted from computing relay means 16 to controller 17. Controller 17 causes valve 11 to open, thereby increasing the amount of catalyst introduced to the reaction zone 12 from 1.0 pound/hour to 1.14 pounds/hour.

This increases the polyethylene production rate to the desired 800 pounds of polyethylene/hour. Process dead time is found to be equal to 9.5 minutes. By employing the inventive compensating network, the deviation of the production rate from the optimum control level was reduced to one-half the value obtainable with conventional feedback control methods. This is a substantial increase in efficiency over conventional methods of control.

As will be evident to those skilled in the art, other modifications of this invention can be made, or followed, in the light of the foregoing disclosure and discussion without departing from the spirit or scope thereof.

We claim:

1. Apparatus for controlling a process variable which comprises, in combination, means for measuring said process variable, means of transmitting a first pneumatic pressure representative of said measurement to a first computing means as an input $A_1$, said first computing means capable of solving the equation:

$$\text{Output} = g_1(A_1 - C_1) + B_1$$

where $A_1$, $B_1$ and $C_1$ are input variable pneumatic pressures and $g_1$ is the adjustable gain of said first computing means, means of transmitting a second pneumatic pressure representative of said output from said first computing means to a control means, means of transmitting a third pneumatic pressure from said control means to a means of adjusting another process variable in response to said second pneumatic pressure, means of transmitting said third pneumatic pressure from said control means to a lag means, means of transmitting a fourth pneumatic pressure from said lag means to said first computing means as said input $B_1$, means of transmitting said fourth pneumatic pressure from said lag means as an input $C_2$ to a second computing means, said second computing means capable of solving the equation:

$$\text{Output}_2 = g_2(-C_2) + B_2$$

where $B_2$ and $C_2$ are variable input pneumatic pressures and $g_2$ is the adjustable gain of said second computing means, means of passing said fourth pneumatic pressure from said lag means through a restriction means to said second computing means as said input $B_2$, and means of transmitting a fifth pneumatic pressure representative of said output$_2$ from said second computing means to said first computing means as said input $C_1$.

2. Apparatus for controlling a process variable which comprises, in combination, means for measuring said process variable, means of transmitting a first pneumatic pressure representative of said measurement to a first computing means as an input $B_1$, said first computing means capable of solving the equation:

$$\text{Output} = g_1(A_1 - C_1) + B_1$$

where $A_1$, $B_1$ and $C_1$ are input variable pneumatic pressures and $g_1$ is the adjustable gain of said first computing means, means of transmitting a second pneumatic pressure representative of said output from said first computing means to a control means, means of transmitting a third pneumatic pressure from said control means to a means of adjusting another process variable in response to said second pneumatic pressure, means of transmitting said third pneumatic pressure from said control means to a lag means, means of transmitting a fourth pneumatic pressure from said lag means to said first computing means as said input $A_1$, means of transmitting said fourth pneumatic pressure from said lag means to a second computing means as an input $C_2$, said second computing means capable of solving the equation:

$$\text{Output}_2 = A_2 - C_2 + B_2$$

where $A_2$, $B_2$ and $C_2$ are variable input pneumatic pressures, means of passing said fourth pneumatic pressure from said lag means through a restriction means to said second computing means as said inputs $B_2$ and $A_2$, and means of transmitting a fifth pneumatic pressure representative of said output$_2$ from said second computing means to said first computing means as said input $C_1$.

3. A pneumatic compensated controller comprising, in combination, means of transmitting a first pneumatic pressure to a first computing means as an input $A_1$, said first computing means capable of solving the equation:

$$\text{Output} = g_1(A_1 - C_1) + B$$

where $A_1$, $B_1$ and $C_1$ are input variable pneumatic pressures and $g_1$ is the adjustable gain of said first computing means, means of transmitting a second pneumatic pressure representative of said output from said first computing means to a control means, means of transmitting a third pneumatic pressure from said control means to a lag means, means of transmitting a fourth pneumatic pressure from said lag means to said first computing means as said input $B_1$, means of transmitting said fourth pneumatic pressure from said lag means to a second computing means as an input $C_2$, said second computing means capable of solving the equation:

$$\text{Output}_2 = g_2(-C_2) + B_2$$

where $B_2$ and $C_2$ are variable input pneumatic pressures and $g_2$ is the adjustable gain of said second computing means, means of transmitting said fourth pneumatic pressure from said lag means through a resistance means to said second computing means as said input $B_2$, and means of transmitting a fifth pneumatic pressure representative of said output$_2$ from said second computing means to said first computing means as said input $C_1$.

4. A pneumatic compensated controller comprising, in combination, means of transmitting a first pneumatic pressure to a first computing means as an input $B_1$, said first computing means capable of solving the equation:

$$\text{Output} = g_1(A_1 - C_1) + B_1$$

where $A_1$, $B_1$ and $C_1$ are input variable pneumatic pressures and $g_1$ is the adjustable gain of said first computing means, means of transmitting a second pneumatic pressure representative of said output from said first computing means to a control means, means of transmitting a third pneumatic pressure from said control means to a lag means, means of transmitting a fourth pneumatic pressure from said lag means to said first computing means as said input $A_1$, means of transmitting said fourth pneumatic pressure from said lag means to a second computing means as an input $C_2$, said second computing means capable of solving the equation:

$$\text{Output}_2 = A_2 - C_2 + B_2$$

where $A_2$, $B_2$ and $C_2$ are variable input pneumatic pressures, means of transmitting said fourth pneumatic pressure from said lag means through a resistance means to said second computing means as said inputs $B_2$ and $A_2$, and means of transmitting a fifth pneumatic representative of said output$_2$ pressure from said second computing means to said first computing means as said input $C_1$.

References Cited in the file of this patent
UNITED STATES PATENTS

| | | |
|---|---|---|
| 2,677,385 | Markson | May 4, 1954 |
| 2,776,670 | Hunt | Jan. 8, 1957 |
| 2,829,322 | Silva | Apr. 1, 1958 |
| 2,972,447 | White | Feb. 21, 1961 |
| 3,020,490 | Kleiss | Feb. 6, 1962 |